United States Patent [19]

Henning et al.

[11] Patent Number: 5,378,136
[45] Date of Patent: Jan. 3, 1995

[54] APPARATUS FOR PRE-SHAPING PLASTICATED PLASTICS MATERIAL

[75] Inventors: Jürgen Henning, Wiesbaden; Norbert Klein, Sulzbach/Taunus; Heinrich Hucke, Minden, all of Germany

[73] Assignee: Hoechst Aktiengesellschaft, Frankfurt am Main

[21] Appl. No.: 94,943

[22] Filed: Jul. 20, 1993

[30] Foreign Application Priority Data

Jul. 22, 1992 [DE] Germany .................... 4224141

[51] Int. Cl.⁶ .............. B29C 47/10; B29C 47/12
[52] U.S. Cl. ................... 425/188; 425/190;
425/442; 425/461; 425/466; 425/394;
425/DIG. 228
[58] Field of Search ............ 425/407, 409, 418, 544,
425/188, 383, 384, 394, 190, 442, 451.5, DIG.
228, 592, 461, 466; 249/161, 162, 171

[56] References Cited

U.S. PATENT DOCUMENTS

| | | | |
|---|---|---|---|
| 3,403,423 | 10/1968 | McMorrow et al. | 425/592 |
| 3,604,497 | 9/1971 | Sylvester | 249/162 |
| 3,830,458 | 8/1974 | Hamblin | 249/162 |
| 4,301,856 | 11/1981 | DiRosa | 249/162 |
| 4,548,568 | 10/1985 | Herbert et al. | 425/188 |
| 4,653,994 | 3/1987 | Capelle | 425/188 |
| 4,737,334 | 4/1988 | Folding et al. | 249/161 |
| 4,983,113 | 1/1991 | Hirschkorn | 425/188 |
| 5,037,289 | 8/1991 | Ohta et al. | 425/442 |
| 5,178,885 | 1/1993 | Vallier et al. | 425/395 |

FOREIGN PATENT DOCUMENTS

| | | |
|---|---|---|
| 0484869 | 4/1992 | European Pat. Off. . |
| 7327157 | 2/1974 | France . |
| 8431941 | 4/1985 | Germany . |
| 1081614 | 8/1967 | United Kingdom . |

*Primary Examiner*—Khanh Nguyen
*Attorney, Agent, or Firm*—Curtis Morris & Safford

[57] ABSTRACT

In the device for pre-shaping plasticated plastics material, a mold formed by two plates (5, 6) arranged so as to be stationary and by two rotatably mounted calibrating jaws (3, 4), and two levers (11, 12) with drive devices (15, 16), are arranged between two columns (1, 2) which are arranged in parallel. One of the calibration Jaws (3, 4) in each case is fastened to one end of the levers (11, 12) and one of the drive devices is fastened to their other end.

6 Claims, 3 Drawing Sheets 4,378,136

APPARATUS FOR PRE-SHAPING PLASTICATED PLASTICS MATERIAL

BACKGROUND OF THE INVENTION

The possibility of processing plasticated plastics material, in particular when it is reinforced with fibers, by compression molding is restricted by the shape of the plasticated material. Coarse deviations from the compression mold cavity, as regards geometry and amount, lead to the mold being filled only incompletely and residual amounts remaining in the discharge nozzle of the plastication device and cooling there. The residual amount can no longer be used for compression molding because there is produced in the plasticated composition a parting seam which, after compression molding, leads to weld seams in the molded part which mechanically weaken the latter.

SUMMARY OF THE INVENTION

The aim of the invention is to remedy this.

This object is achieved by an apparatus wherein a mold formed by two plates arranged so as to be stationary and by two rotatably mounted calibration jaws, and two levers with drive devices, are arranged between two columns which are arranged in parallel, one of the calibration jaws in each case being fastened to one end of the levers and one of the drive devices in each case being fastened to their other end.

In a development of the apparatus, the calibration jaws are provided with profiling grooves and the columns with devices for fastening the apparatus to a plastication device. Further developments are specified in the subclaims.

The advantages achieved by the invention can be seen essentially in that preforms of plasticated, long fiber-reinforced plastics material of any geometry can be produced without molding residues.

BRIEF DESCRIPTION OF THE DRAWINGS

The invention is described in greater detail below with the aid of drawings showing only one embodiment, in which.

DETAILED DESCRIPTION OF THE INVENTION

Figure 1:
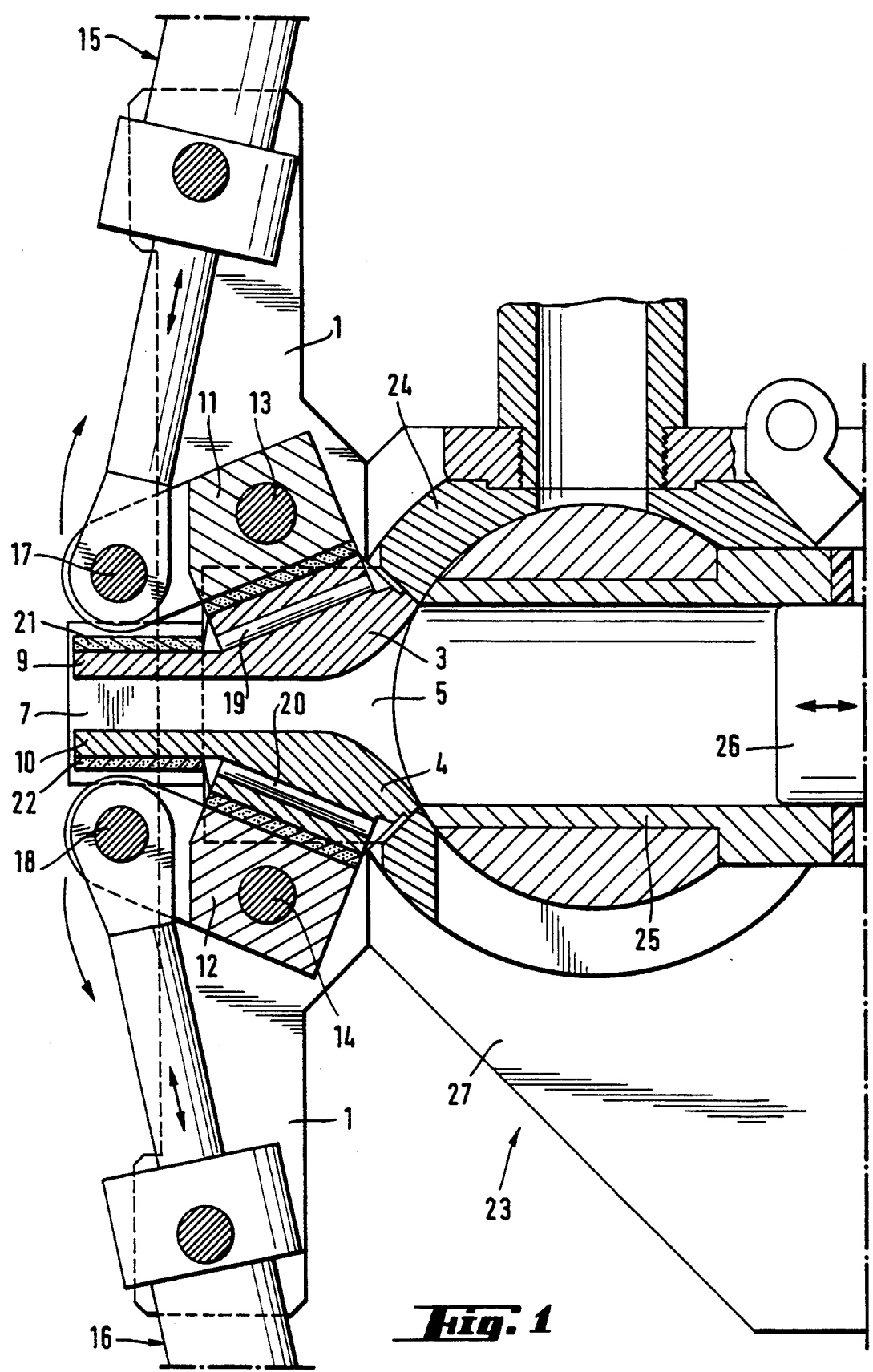
FIG. 1 shows a partly cutaway side view of the device.
Figure 2:
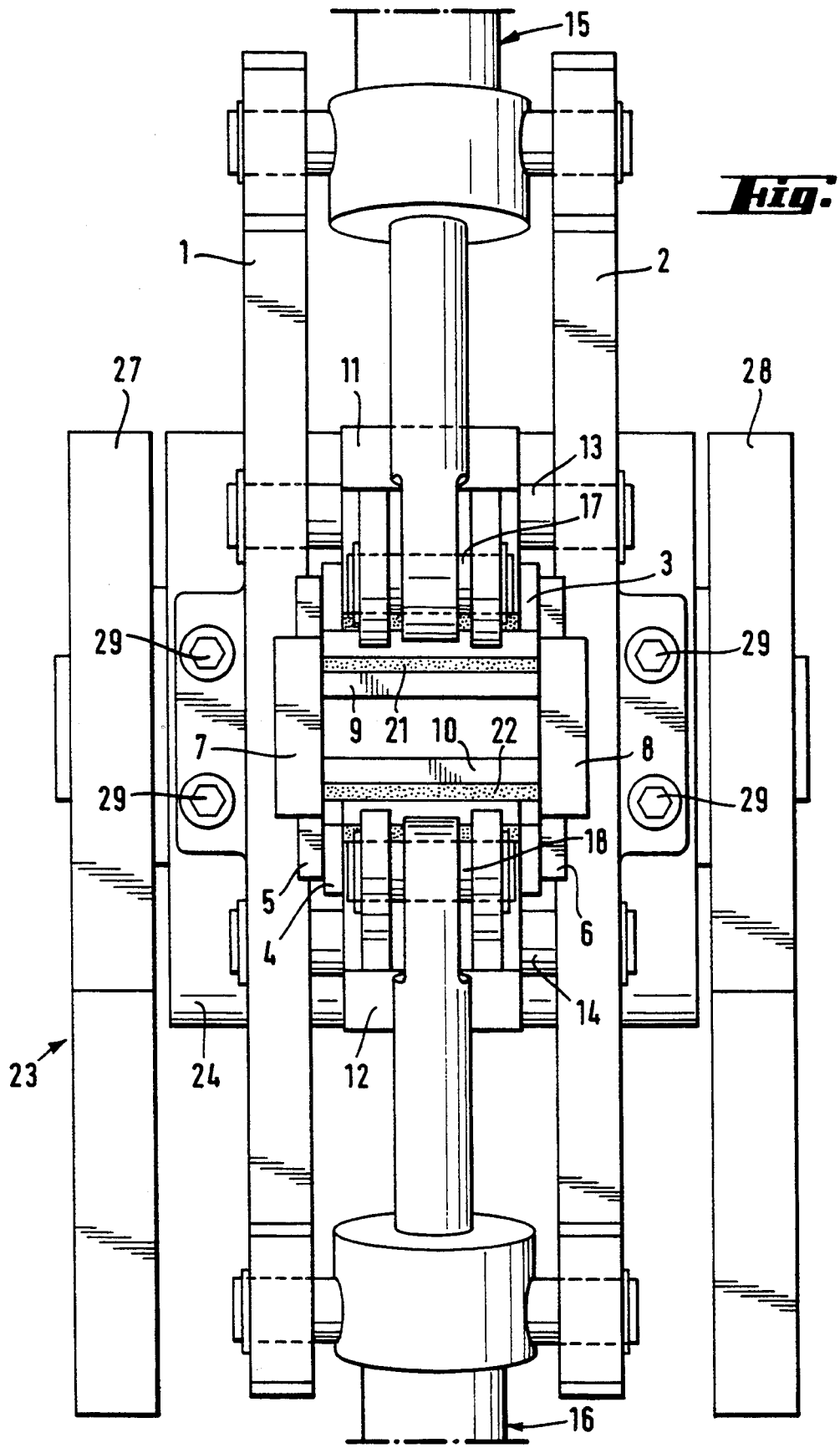
FIG. 2 shows a front view of the device.
Figure 3:
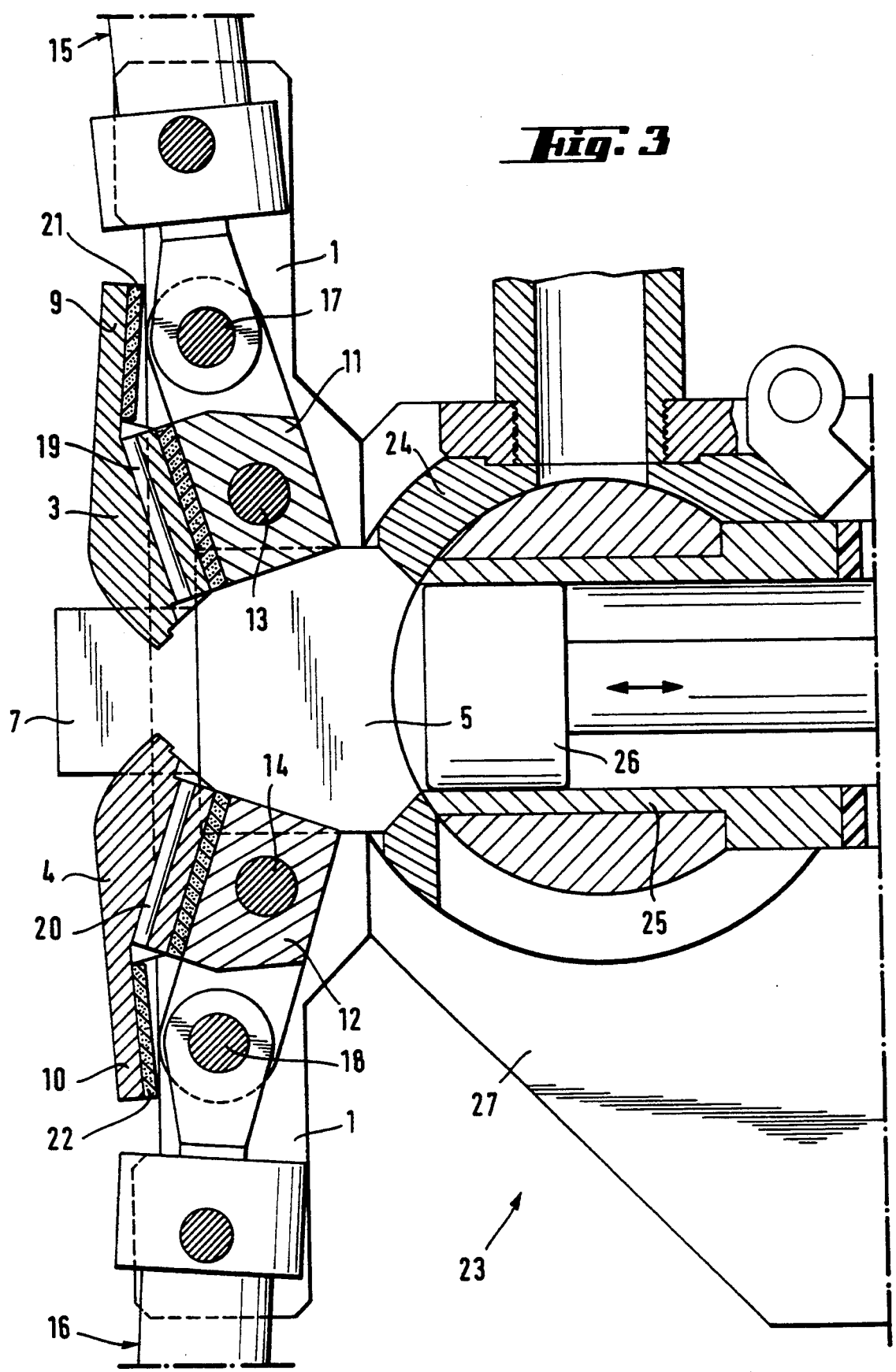
FIG. 3 shows a device according to FIG. 1 in the opened state.

A mold for producing preforms from plasticated plastics material is arranged between two columns (supports) 1, 2 arranged in parallel. The mold is formed by two mutually opposite, rotatably mounted calibration Jaws 3, 4 and two stationary plates 5, 6 delimiting said calibration jaws 3, 4. The stationary plates 5, 6 are fastened to the columns 1, 2 and have extensions 7, 8 in the flow direction of the preform. The calibration jaws 3, 4 also have extensions 9, 10. Moreover, two levers 11, 12 are arranged between the columns 1, 2 so as to be rotatable via joints 13, 14. One of the calibration jaws 3, 4 in each case is fastened at the rotatably mounted end of the levers 11, 12. The free end of the levers 11, 12 is connected to one drive device 15, 16 in each case, via joints 17, 18. The calibration jaws 3, 4 and/or the stationary plates 5, 6 can be provided with profile grooves (not shown). Thus, preforms having, for example, stellate, rectangular, square, triangular, oval or any other cross section can be produced. The calibration jaws 3, 4 can be provided with heating devices 19, 20; their extensions 9, 10 can be provided with heat-protection plates 21, 22, which can also be provided with heating devices (not shown). 23 indicates the plastication device, specifically the housing 24 having, rotatably mounted therein, a discharge barrel 25 with discharge ram 26 and the machine parts 27, 28 on which the device according to the invention is fastened (screw connection 29). The metered, plasticated composition is forced out of the discharge barrel 25 by means of the discharge ram 26. The pressure occurring at the shaping elements during this is countered by the drive devices 15, 16 for the calibration jaws 3, 4, so that the desired geometry of the plasticated material is produced. In order that no residues remain in the shaping mold, the calibration jaws 3, 4 fold apart at the end of the discharge operation and pull the plasticated material with them. The pivoting motion effected by the levers 11, 12 pulls the material with it and also shapes the end of the batch to the desired geometry. In this manner, the entire metered material is shaped as a whole. The essential advantage of this procedure is the production of the desired geometry without molding residues. For the purpose of simple cleaning, the two shaping calibration jaws 3, 4 can also be folded apart completely (FIG. 3).

We claim:

1. An apparatus for pre-shaping plasticated plastic material, comprising:
    (a) a mold assembly comprising:
        (i) two opposing supports, each having an inner surface;
        (ii) two opposing stationary plates each positioned adjacent one opposing support inner surface;
        (iii) a first and second opposing rotatably mounted calibration jaw positioned between said two opposing stationary plates, thereby forming a mold,
        (iv) each of said first and second opposing rotatably mounted calibration jaw having an inner opposing surface of a specific profile;
        (iv) a first and second drive device;
        (v) a first and second opposing lever, each slidably and rotatably mounted to and between said two opposing supports; and
        (vi) each of said levers having a first and second end wherein said first end of the first lever is rotatably mounted to said first opposing calibration jaw, and said first end of said second lever is rotatably mounted to said second opposing calibration law; and wherein said second end of said first lever operationally engages said first drive device, and said second end of said second lever operationally engages said second drive device, whereby said levers rotate said first and second calibration jaws between a closed and open position such that rotating motion between said closed and open position pulls a remainder of a predetermined amount of plasticated plastic material through said mold thereby shaping said remainder to said profile of said inner opposing surface of each calibration jaw.

2. The apparatus as claimed in claim 1, wherein the calibration jaws have profiling grooves.

3. The apparatus as claimed in claim 1, wherein the supports have devices for fastening to a plastication device.

4. The apparatus as claimed in claim 1, wherein the calibrating jaws are provided with heating devices.

5. The apparatus as claimed in claim 1, wherein the calibration jaws and the stationary plates have extension parts.

6. The apparatus of claim 1, further comprising: a plastication device attached to the mold assembly, comprising:
(i) a discharge barrel;
(ii) means for delivering a predetermined amount of plasticated plastic material to said discharge barrel; and
(iii) a discharge ram conforming to said discharge barrel for discharging the plasticated plastic material through said mold.

* * * * *